United States Patent [19]

Waldron

[11] Patent Number: 5,016,980
[45] Date of Patent: May 21, 1991

[54] SYSTEMS FOR DEVIATING AND (OPTIONALLY) CONVERGING RADIATION

[76] Inventor: Robert D. Waldron, 15339 Regalado St., Hacienda Heights, Calif. 91745

[21] Appl. No.: 334,685

[22] Filed: Apr. 6, 1989

Related U.S. Application Data

[62] Division of Ser. No. 796,957, Nov. 12, 1985, Pat. No. 4,867,514.

[51] Int. Cl.$^5$ ............................................. G02B 5/04
[52] U.S. Cl. ..................................... 350/286; 350/287
[58] Field of Search ........... 350/286, 287, 6.4, 162.12, 350/167, 433

[56] References Cited

FOREIGN PATENT DOCUMENTS

3739697 12/1988 Fed. Rep. of Germany ...... 350/286

Primary Examiner—Paul M. Dzierzynski

[57] ABSTRACT

Systems for deviating and (optionally) converging radiation include two optical devices preferably in parallel planes with one device producing convergence, and the other divergence. Alternatively, the deviating effect can be produced by an array of pairs of dove prisms with the tips of the prisms in each pair either joined to one another or separated by dielectric of lower refractive index, and with the adjacent contiguous pairs joined periodically at the base of each prism along the contiguous surfaces or separated from one another by dielectric.

12 Claims, 6 Drawing Sheets

SYSTEMS FOR DEVIATING AND (OPTIONALLY) CONVERGING RADIATION

This application is a division of U.S. patent application Ser. No. 06/796,957, filed Nov. 12, 1985 now U.S. Pat. No. 4,867,514.

This invention relates to systems and methods for deviating or changing the direction of, and optionally converging radiation such as solar radiation. These systems and methods facilitate the concentration of radiation, particularly solar radiation, incident on such systems.

In one embodiment, the new systems for deviating (and optionally converging) radiation comprise, in a first plane, first optical means for producing converging radiation from incident, substantially parallel (i.e., collimated) radiation passing through the first optical means. These systems also include, in a second plane, substantially parallel to the first plane, second optical means for receiving, as incident radiation, converging radiation from the first optical means and for recollimating or reducing the degree of convergence of the incident, converging radiation as it passes through the second optical means. In this embodiment, the first and second optical means have substantially coincident focal zones (points or lines), and at least one of the first and second optical means is movable to maintain substantial coincidence of their focal zones as the angle of incidence of radiation on the system changes.

This first embodiment can also cause radiation incident on the opposite side of these systems to divert into a discrete number of multiple beams traveling in different directions where the radiation first passes through the second optical means, and then passes through the first optical means.

In this first embodiment, the optical means in the first plane can be a plurality of simple cylindric lenses in edge-to-edge array, a plurality of quasi-spherical lenses, a plurality of simple spherical lenses, a plurality of aspheric lenses, or a plurality of spherical lenses having two convex surfaces.

The optical means in the second plane of this first embodiment can be a plurality of simple negative lenses in substantially edge-to-edge array. The second optical means can, for example, also be a plurality of interrupted wavefront negative lenses or aspheric negative lenses.

The ratio of the focal length of the first optical means to the focal length of the second optical means can vary. As the ratio of the focal length of the first optical means to the focal length of the second optical means increases, the angular dispersion of radiation beam intensity, and the ratio of dark to illuminated zones, after passing through the second optical means, increases in direct proportion. Preferably, the ratio of the focal length of the first optical means to the focal length of the second optical means should approximate the value at which the mean angular image width of radiation at the first focal zone is about equal to the mean angular width of aberrations produced by the first optical means. Alternatively, the focal length of the first optical means should be substantially equal to the value at which the mean image angular width of radiation at the focal zone of the first optical means is approximately the same as the angular width of aberrations produced by the first optical means.

Incident radiation on any single lens or array of lenses may be characterized by the angular size and shape of the radiation source at the plane of incidence. The angular size and shape, in turn, can be defined in terms of angular width and height with respect to any selected reference axes in the apparent plane of the radiation source.

A positive cylindric lens or array of lenses produces convergence of incident radiation only along a direction perpendicular to the meridian axes of the cylindrical lenses, and does not affect the elevation of incident radiation or of radiation emerging from such lenses above or below a plane perpendicular to the meridian axes of the first optical means. As such, a positive cylindric lens or array of lenses produces a narrow line image parallel to the lens axes from both a small angular diameter circular source, and from a long, narrow source, if the long axis of the narrow source is aligned with the meridian axes of the lenses. A positive spherical lens or array of lenses, however, produces convergence in both lateral and vertical planes with an angular width about the same as the angular width of the incident radiation.

The embodiments of this invention provide controlled deviation of the mean angle of incident radiation in at least one perpendicular plane. To perform satisfactorily, these embodiments should produce an image having a linear perpendicular width that is substantially smaller than the lateral width of a lens element (see FIG. 1). In other words, the lateral angular image width, expressed in radians, produced by these embodiments should be less than $s/f$ or $1/F$ where $f$ is the lens focal length and "F" is the lens "F" number. In practice, the "F" number is at least about 3, so that the lateral angular image width of radiation emerging from the system is much less than about 19°. These embodiments perform efficiently where the angular image width is about 5° or less. For solar imaging devices, the angular width of the sun is about 0.5° which would permit an "F" number of up to about 25, although higher values increase angular spreading of the radiation emerging from the system.

The first embodiments of this invention can be used at any wavelength for which suitable optical transmission and refraction can be obtained. Preferably, most of the incident radiation should have a wavelength in the range of about 0.3 to about 14 microns, or, alternatively, from about 100 to about 10,000 microns, i.e., for microwave beams.

In one form of this first embodiment, the system comprises, in a first plane, a plurality of positive, cylindric lenses in substantially edge-to-edge array, with each of the positive cylindric lenses having a focal length to width ratio of about 3:1 to about 12:1, and a width in the range of about 0.125 inch to about 3 inches; and, in a second plane, substantially parallel with the first plane, a plurality of negative, cylindric lenses in substantially edge-to-edge array. Each of the negative lenses has a focal length of about 10% to about 40% of the focal length of the positive lenses in the first plane, and a width ranging up to about 110% of the width of the positive lenses in the first plane. With this form of the first embodiment, for radiation having its source at infinity (or virtual infinity), the focal zones of each of the positive lenses in the first plane substantially coincide with the focal zones of corresponding negative lenses in the second plane, and at least on of the lens planes is movable to maintain this substantial coincidence for radiation incident on the system and having a transverse angular beam width of up to about 5°.

Where the first optical means is a plurality of positive lenses in edge-to-edge array, and the second optical means is a plurality of negative lenses in substantially edge-to-edge array, the ratio of the focal length of the lenses in first optical means to the width of these lenses is preferably in the range of about 3 to about 5. Moreover, the ratio of the focal length of the lenses in the second optical means to the width of the lenses in the second optical means is preferably sufficiently small to transmit incident radiation at the maximum required angular deviation from the optical axis of the first optical means, and preferably are in the range of about 0.3 to about 1. Preferably, this ratio decreases as the maximum required angular deviation from the optical axis of the first optical means increases.

In this form of the first embodiment, preferably, each of the plurality of negative cylindric lenses has substantially the same width as each of the positive cylindric lenses. More preferably, the distance from one lens centerline (or axis) to the centerline (or axis) of a contiguous lens is preferably the same or about the same within each group of contiguous lenses in the first plane, and is the same or about the same for each corresponding group of contiguous lenses in the second plane. Moreover, the plurality of negative lenses is preferably movable laterally in the second plane, and is movable toward and away from the first plane. Alternatively, the plurality of positive lenses in the first plane may be movable laterally, and movable toward and away from the second plane, to maintain substantial coincidence of the focal zones of each of the lenses in the two planes.

This form of the first embodiment can be modified to concentrate, as well as to deviate radiation incident on the system. To this end, the width (or distance from one lens axis or centerline to the axis or centerline of a contiguous lens) of each of the negative, cylindric lenses should be somewhat larger than the width of the positive, cylindric lenses in the first plane. Preferably, the width of each of the negative cylindric lenses is expressed by the quantity Ns divided by $N-1$, where N is the number of contiguous positive cylindric lenses in the first plane which are chosen to provide radiant energy to a common concentration zone, and s is the width of each of these positive cylindric lenses.

Both of these forms of the first embodiment can also be combined with a non-radiation-deviating means, or uniform radiation-deviating means through which radiation passes before becoming incident on the system. One such means is a glazing panel having optical absorption or fluorescent properties to absorb, or otherwise eliminate, most of the short wavelength (UV) radiation which would otherwise fall upon, and adversely affect the system. Additionally, or alternatively, the system can also be combined with means for removing radiation of longer wavelengths from incident radiation to minimize internal heating in the system.

With the modified form of the first embodiment that functions to both deviate and concentrate radiation incident on the system, the location of image zones for radiation emerging from the system depends on the angle of incidence of radiation on the first optical means and the relative lateral displacement between the first and second optical means. Absent any relative movement between the first and second optical means, the image of radiation emerging from the system shifts substantially for small changes in the angle of incidence.

For efficient collection of convergent, concentrated radiation from the system, lateral displacement of the second optical means should be limited to less than about half the linear distance between adjacent elements in the second optical means.

To operate in both lateral directions, the first optical means should take the form of a two-dimensional, periodic lattice of circular or hexagonal lenses with a corresponding, enlarged lattice arrangement for the elements in the second optical means. The ratios of axial lattice spacings between the first and second optical means need not be identical for x and y axes. If the x to y ratio of elements in the first optical means is not identical to the corresponding ratio in the second optical means, the system will produce stigmatic line images in different planes and with different spacings.

A second class of embodiments of these systems for deviating radiation comprises a periodic array of pairs of dove prisms wherein the apexes (or upper, non-reflecting surfaces opposite the prism bases) of the dove (trapezoidal) prisms in each pair face one another, and where the pairs are arrayed on an axis with the base of one dove prism in a first pair periodically joined to, or parallel to, the base of one of the dove prisms in a second pair.

In preferred embodiments, the dove prisms in each of the pairs are joined to one another at their apexes. In this form, the dove prisms in each pair may have a flat surface substantially parallel to the base of each prism so that the dove prisms in each pair are joined to one another along these flat surfaces at their apexes or tips, or the prism pairs may be molded as a single symmetric element. Alternatively, modified dove prisms in each pair having flat reflective surfaces substantially parallel to the bases of each prism may be used, with each pair having an air gap or interposing dielectric layer of lower refractive index, between these opposing surfaces. This form of the second embodiment also includes an air or other dielectric gap between the bases of prisms in contiguous pairs.

In the form where the dove prisms in each pair are connected at their apexes, bases of the prisms in the joined pairs and in adjacent pairs are substantially parallel, and the apex length of each prism is preferably in the range of about 5% to about 25% of the prism base length. Preferably, the width of each dove prism in the mean plane of the rays is in the range of about 0.01 inch to about 0.25 inch, and the height of each prism is limited only by torsional rigidity, but would generally range up to about 10 feet. Preferably, too, the refractive index of each dove prism is in the range of about 1.4 to about 1.6.

In preferred embodiments, the array of dove prism pairs is rotatable along an axis perpendicular to the mean plane or direction of propagation of radiation incident on the system, and parallel to the entrance, exit and reflecting faces of each of the prisms. Two prism arrays, with their axes at appropriate angles to one another, can be used to deviate radiation in two non-coincident planes, and thus propagate radiation in any direction.

Figure 10:
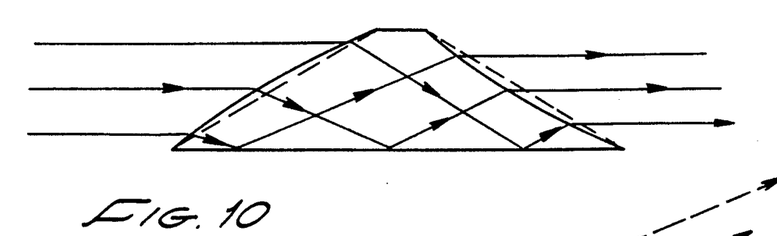
FIGS. 10 and 11 show the actual and virtual paths of radiation passing through a dove prism in a third form of the second embodiment of this invention.

In two forms of this second embodiment, the input and output faces on each of the dove prisms may be shaped to reduce the individual linear beam width, or to slightly converge and diverge, incident radiation passing through the system. To this end, the entrance face of each prism in the array can be positively curved (i.e., convex to the incoming ray) so that radiation passing through that face undergoes convergence. The exit face of each prism can be negatively curved (i.e., concave toward the external receding ray) so the radiation passing through the other face undergoes divergence. Further, in the forms with air or a dielectric gap at the apex (see FIG. 10 for an example), the surface at the prism apex can be tilted in the range of about 1° to about 2.5° and have a radius of curvature in the range of about 40 to about 180 times the prism base length. Where one face of each of the prisms has positive curvature, the radius of curvature is preferably in the range of about 1 to about 4 times the prism base length. Similarly, where the other face of each dove prism has negative curvature, the radius of curvature is preferably in the range of about two-thirds to about 3 times the prism base length. Radiation incident on, and passing through the two faces preferably undergoes a reduction in linear beam width of at least 10%.

This invention can better be understood by reference to the drawings, in which.

Figure 1:
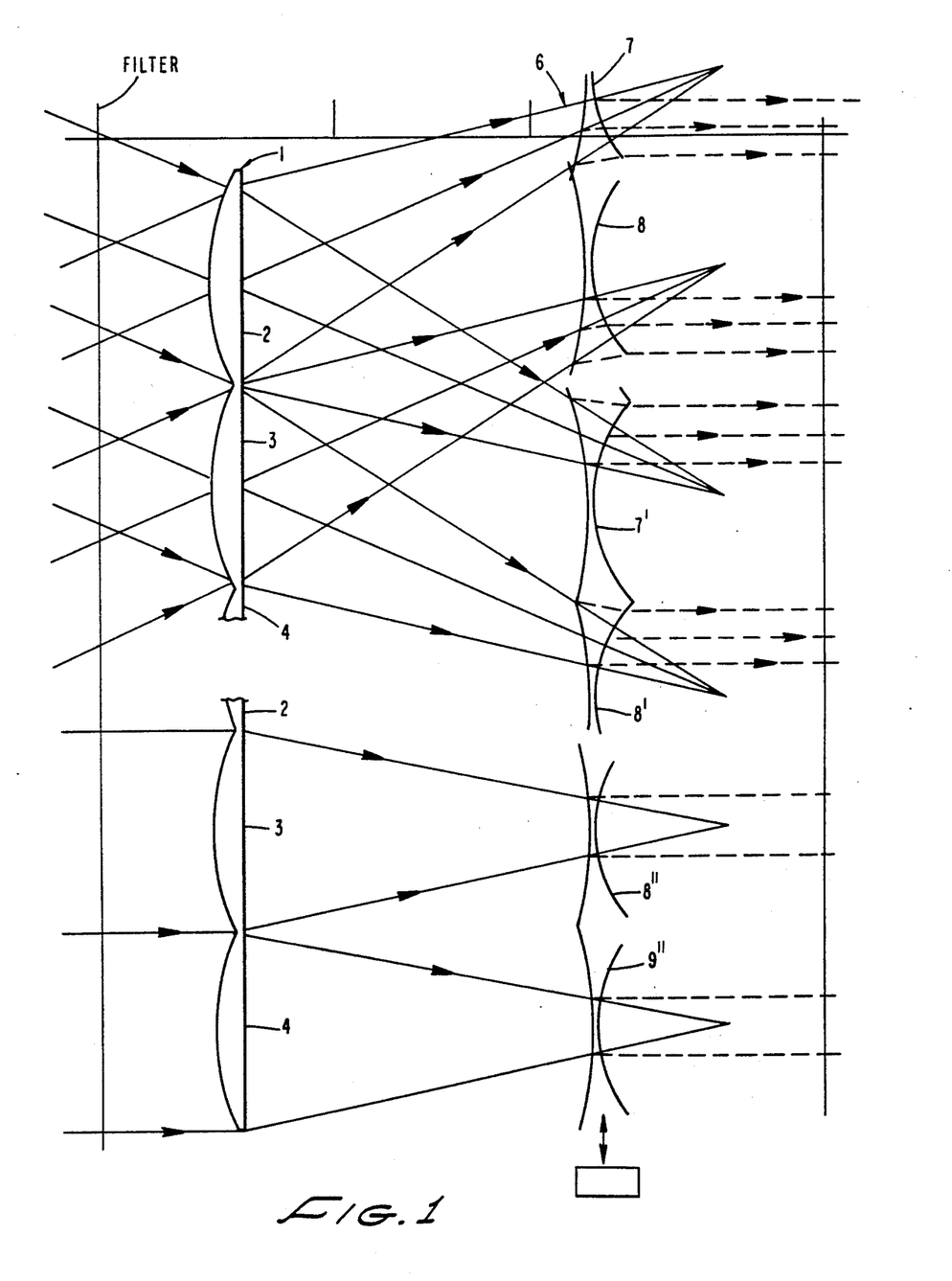
FIG. 1 shows one form of the first embodiment of this invention.

FIG. 1 shows one form of the first embodiment of this invention comprising, in a first plane generally designated 1, a plurality of positive cylindric lenses 2, 3 and 4 joined to one another in substantially edge-to-edge array. In a second plane, generally designated 6, a plurality of negative, cylindric lenses 7, 8 and 9 are joined to one another in substantially edge-to-edge array. All of the positive lenses in plane 1 have equal focal lengths, and the lens plane is so positioned that the focal points are substantially coincident with the focal points of the corresponding negative lenses in second plane 6. The lenses in the second plane 6 are movable laterally, and toward and away from the lenses in first plane 1, to maintain substantial coincidence of the focal points of the lenses in plane 1 with the corresponding lenses in plane 6.

In operation, the focal points of positive lenses 2, 3 and 4 are made to coincide with the focal points of negative lenses, 7, 8 and 9, respectively. As a radiation source such as the sun moves angularly with respect to the first lens plane, the second lens plane is moved so that lenses 7, 8 and 9 move through positions 7″, 8″ and 9″ toward 7′, 8′ and 9′.

Figures 2, 4:
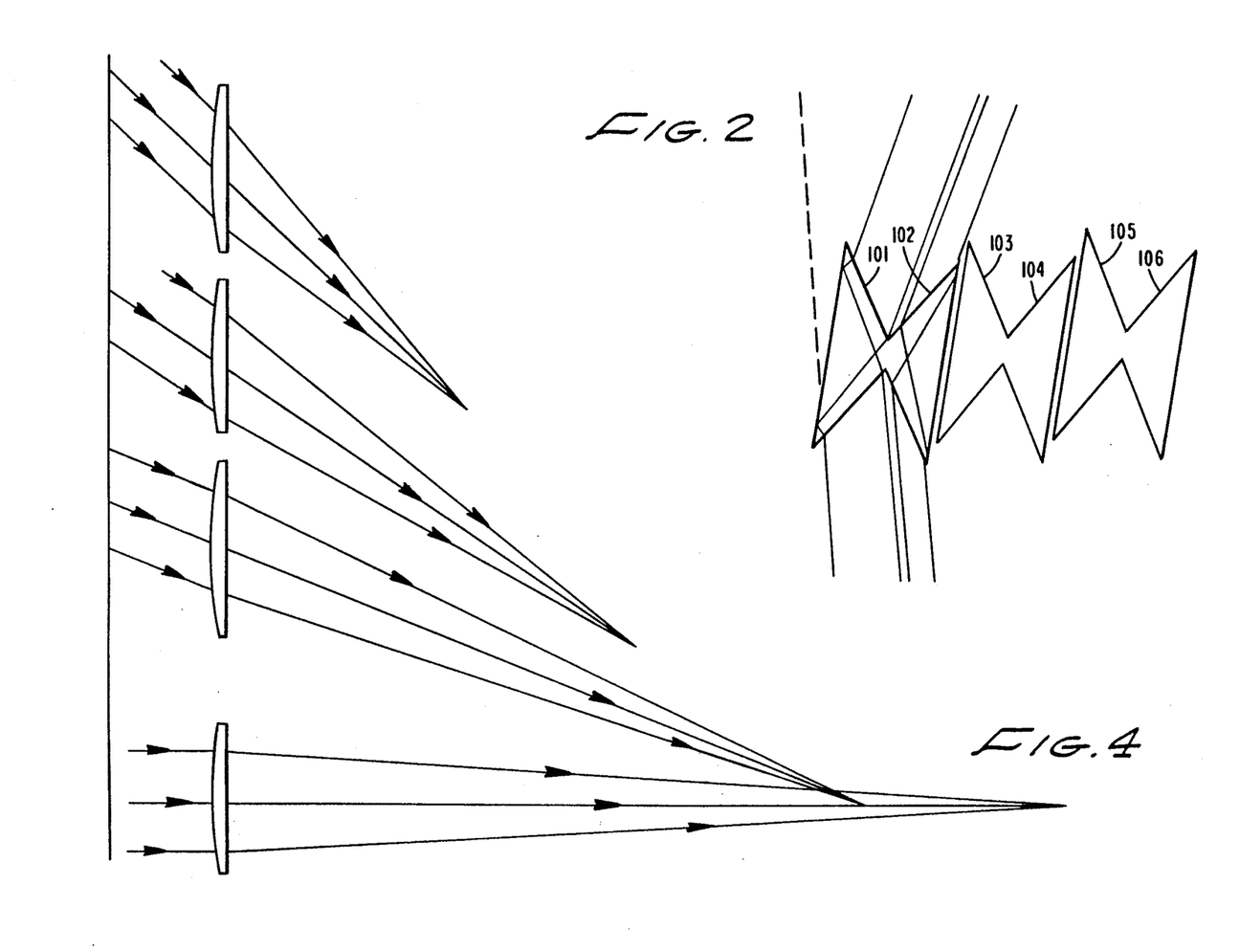
FIG. 2 shows one form of the second embodiment of this invention.
FIG. 4 shows how the first optical means of the system illustrated in FIG. 1 acts upon incident radiation to change the location of the focal points as the angle of incidence changes.

FIG. 4 shows that, as the angle of incidence of radiation on the positive cylindric lenses shifts from the meridian plane of the lenses, the perpendicular distance of the virtual or real line images produced by each of these lenses moves closer to plane 1. As this happens, the spacing between planes 1 and 6 should be reduced, and their relative lateral positions adjusted to maintain substantial coincidence between the virtual focal zones of the positive cylindric lenses in plane 1 and the negative cylindric lenses in plane 6.

The range of angular error for radiation emerging from the system depends on manufacturing and positioning tolerances and distortions in the lenses caused by gravity, thermal expansion of the lenses, and other structural stresses in the lenses. The sensitivity to absolute positioning errors of the first and second optical means can be reduced by increasing the width of the lenses and their focal lengths, but this requires larger and thicker lenses and increases cost.

As FIG. 1 shows, control of the direction of deviation of radiation incident on the system is attained by controlling the precise displacement of the center line or midplane of each lens in plane 6 with respect to the virtual free image points or lines produced by the lenses in plane 1. The positions of these virtual free image points or lines depend on the centerline or optical axis positions of the lenses in plane 1, and the input angle of radiation incident on plane 1.

Radiation emerging from plane 6 appears as a series of light zones separated by dark zones. The radiant intensities in the light zones are greater than the corresponding zones in radiation incident on the system. The angular dispersion of the light zones is increased in direct proportion to the ratio of the focal length of the lenses in the first plane to the focal length of the lenses in the second plane. To concentrate energy emerging from the system, the beam widths can be reexpanded to produce a nearly continuous wavefront of energy by means of an additional optical element such as divergent-convergent lens array pairs.

The system illustrated in FIGS. 1 and 4 can also be operated with energy incident first on the back side of plane 6. Energy incident on, and passing through the lenses in plane 6 undergoes divergence, and then undergoes convergence upon passing through the lenses in plane 1. The energy emerging from plane 1 comprises several sets of nearly collimated energy beams, each of lower intensity than the input beam, emerging at angles to the plane 1 whose tangents increase or decrease in nearly uniform intervals. The actual angles can be rapidly changed with small lateral displacements between planes 1 and 6, or alternatively, by changing the angle of incidence of the input radiation.

For operation as a convergent/divergent system, the form of the first embodiment shown in FIGS. 1 and 4 should operate with good transmission efficiency over a range of input angles of incidence. For small ranges, the positive cylindric lenses can be replaced with interrupted wavefront optical devices such as Fresnel lenses, but for ranges such as ±45° to, say, ±60°, the cylindric lenses shown in FIGS. 1 or 4, or quasi-spherical lenses for a two axis structure, are preferred.

Figure 5:
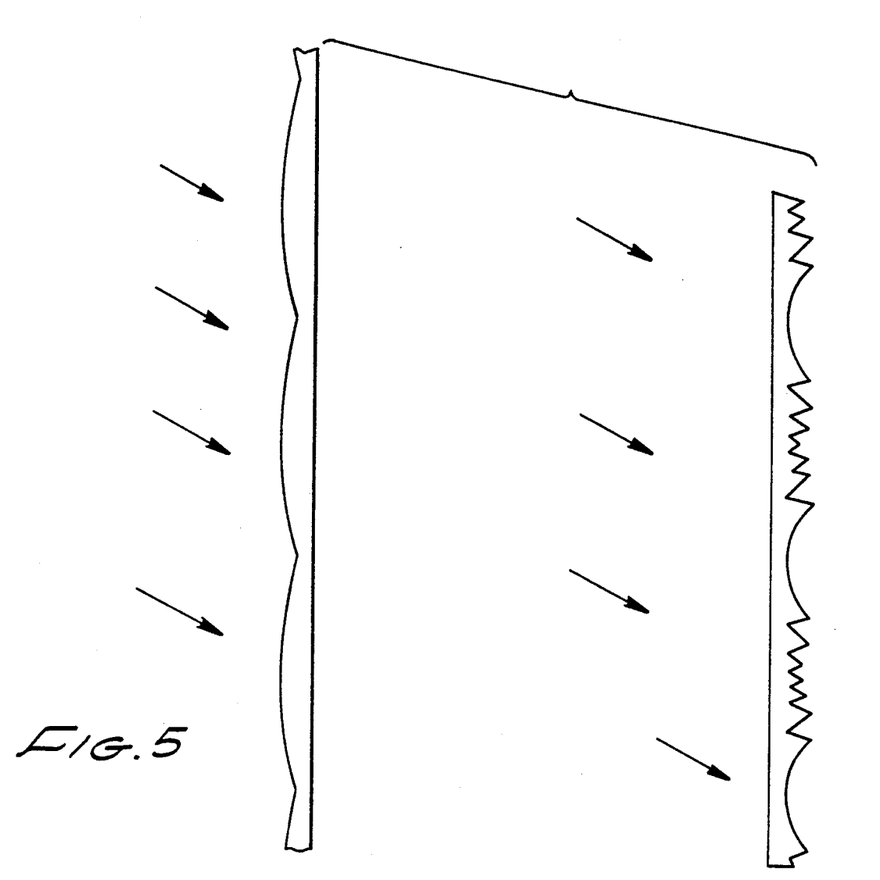
FIG. 5 shows alternate forms of both optical means in the first embodiment of this invention.

To minimize optical aberrations, such as spherical and chromatic aberration, the elements in plane 1 can have a meniscus profile as shown in FIG. 5 and/or a non-uniform curvature, or both. Chromatic aberration can be minimized by using low dispersion, or high Abbe number optical materials, or by using a laminated or fused achromatic lens design consisting of a strongly convergent lens of high Abbe number attached to a weaker, negative lens of low Abbe number.

FIG. 5 shows alternative optical elements in plane 6, namely, interrupted wavefront (Fresnel) negative lenses. Spherical aberrations can be minimized by using optical elements of non-uniform curvature. Use of low Abbe number materials can also partly compensate for chromatic aberrations.

An alternative design for the second optical means is an interrupted wavefront array of double reflection prisms which may be termed a double-reflection pseudo lens. This pseudo lens functions like a lens, and eliminates chromatic aberration and beam angle sensitivity to surface angle error.

Figure 3:
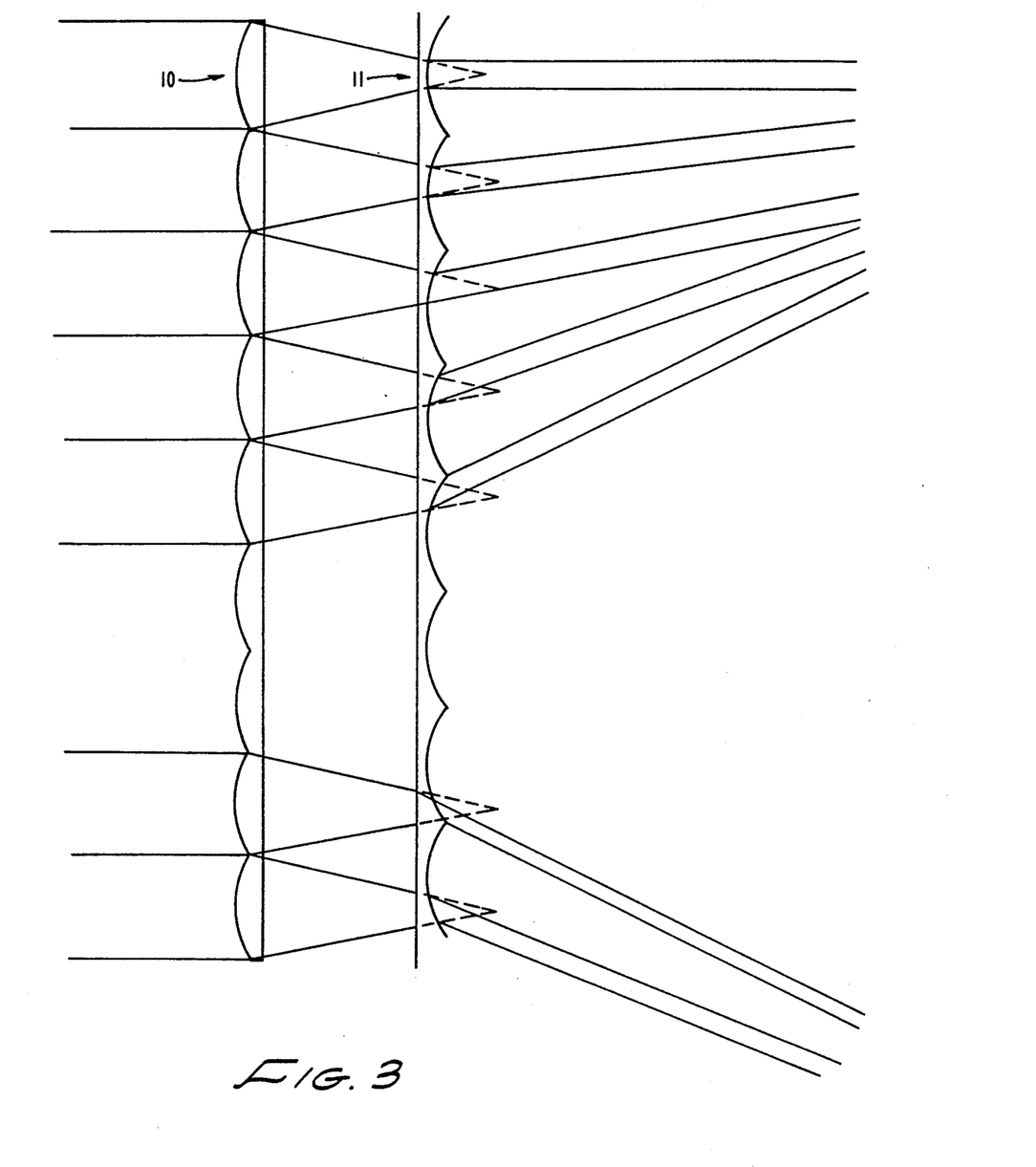
FIG. 3 shows a second form of the first embodiment of this invention.

FIG. 3 shows a second form of the first embodiment of the invention in which the number of elements in plane 10, corresponding to plane 1 in FIG. 1, is greater than the number of elements in plane 11, corresponding to plane 6 in FIG. 1. Radiation passing through the positive, cylindric elements in plane 10 and the negative, cylindric elements in plane 11 are changed in direction and concentrated.

Figure 6:
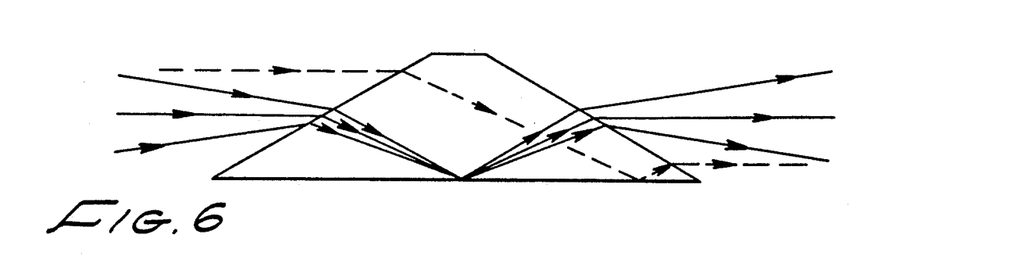
FIGS. 6 and 7 show the actual and virtual paths of radiation passing through a dove prism in one form of the second embodiment of this invention.
Figure 8:
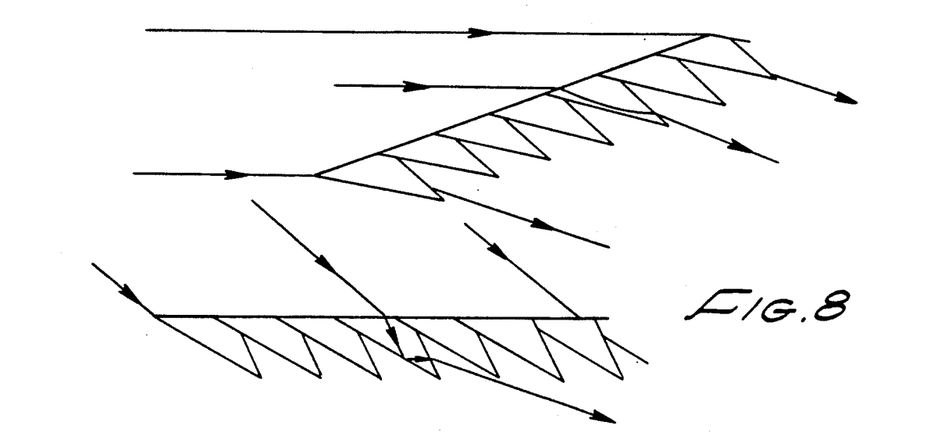
FIG. 8 shows how the effective beam width of radiation incident on an array of unpaired (base to apex) dove prisms changes with the incident angle of radiation.

FIGS. 2 and 6 show a first form of the second embodiment of this invention. In this form, pairs of dove prisms 101/102, 103/104, and 105/106 are joined to one another at their apexes. The prism pairs 101/102, 103/104 and 105/106 may also be joined to one another, periodically, along the bases of prisms in contiguous pairs. Preferably, however, an air gap or dielectric layer separates the bases of prisms in contiguous prism pairs to obtain good efficiency. This periodic array of dove prisms achieves good transmission efficiency as the angle of incidence of radiation on the system changes. Moreover, the system, as shown in FIG. 2, suffers smaller losses in incident radiation than a system in which the dove prisms are joined apex to base throughout the system as illustrated in FIG. 8.

As FIG. 2 shows, the dove prism pairs are preferably arrayed along a common axis, and sets of prism pairs are preferably rotated together, as by parallelogram linkages, geared chains or belts, or gear trains. Clustering sets of prism pairs into rigid groups also reduces channel losses as compared to individual rotation of prism pairs.

Figure 7:
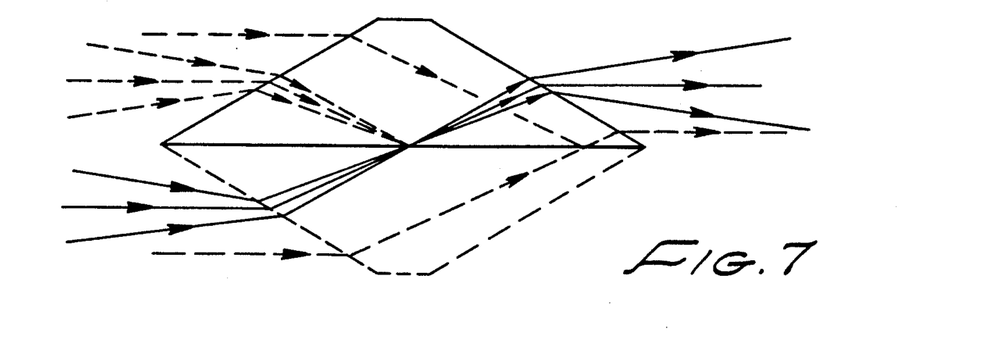

FIGS. 6 and 7 show that the base of each dove prism totally reflects rays whose internal angle of incidence exceeds a critical value, denoted $i_c$, where $\sin i_c$ is equal to 1 divided by n, and where n is the refractive index ratio between the prism material and the exterior medium, typically air. The virtual image of the prism and the paths of radiation passing through the prism upon reflection from the prism base appear in FIG. 7.

For satisfactory operation, radiation passing through the dove prisms intercepts the base of the prisms at an angle greater than the critical angle $i_c$, and a useful fraction of radiation incident on the entrance face of the prism emerges from its exit face for a given angle of incidence or operating position of the dove prisms. There is only one angle of incidence at which rays entering the prism will pass through the prism without blockage for a given prism length. Radiation that enters the dove prisms, but fails to emerge from the prisms, is termed channel loss. To minimize channel loss over the desired range of angles of incidence, the distance across the apex of each prism should be as small as practicable, consistent with maintaining the prism face angle sufficiently large to refract radiation internally, and to minimize the deviation in radiation that passes through the prisms.

Figure 9:
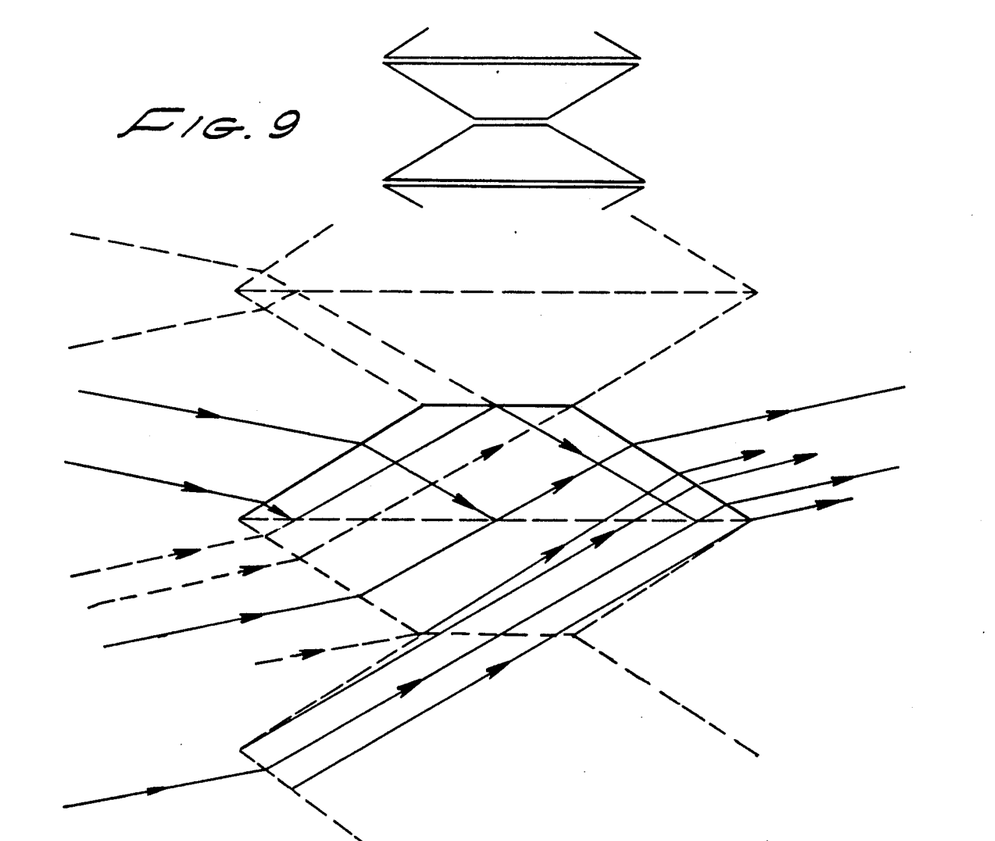
FIG. 9 shows the actual and virtual paths of radiation passing through a modified dove prism in a second form of the second embodiment of this invention.

FIGS. 9, 10, 11 and 12 show additional forms of the second embodiment of this invention. In FIG. 9, the apexes of the prisms in each dove prism pair are not fused, but have an air or other dielectric gap between them. Similarly, air or other dielectric gaps are maintained between the bases of prisms in contiguous pairs. This system has virtually no channel losses for at least two angles of incidence, and can have lower average channel losses over a range of input angles than the first form of the second embodiment shown in FIGS. 2 and 6. The length of the apex face is preferably between 100% and 150% of the transverse width of the prism.

Figure 11:
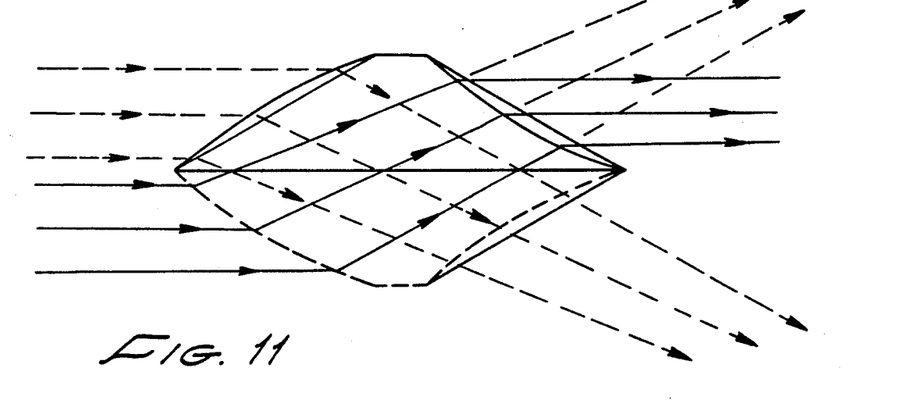

A third form of the second embodiment of this invention, shown in FIG. 11, has a positively curved entrance face and a negatively curved exit face on each prism. Radiation passing through such prisms undergoes partial convergence and divergence, particularly where the focal length of the exit lens surface in each prism is smaller than the focal length of the entrance face. For example, if the positive and negative lens focal lengths of the entrance and exit faces of each prism are in the ratio of 5:4, radiation incident on such prisms contracts laterally about 20% in passing through the prisms.

This slight convergence-divergence action results in a range of input angles with zero channel loss in contrast to the single angle or pair of angles with zero channel loss for the systems of FIGS. 6 and 9, respectively. Referring to FIG. 11, in the input rays Q, P and R were inclined at an increasing angle with respect to base AB and descending (approaching A-B axis) as they neared face AC, the reflected rays leaving face AB would ascend more steeply until an input angle was reached where the reflected ray from point A would reach point D. Conversely, if the input rays were ascending as they approached face AC, the refracted rays leaving face AC and approaching base AB would descend more gradually until an input angle was reached where the refracted ray from point C would reach point B. For input rays at any angle between these two limiting angles, there should be zero channel loss. This effect can lower the average channel loss for a single prism or prism pair for a typical range of input angles.

Figure 12:
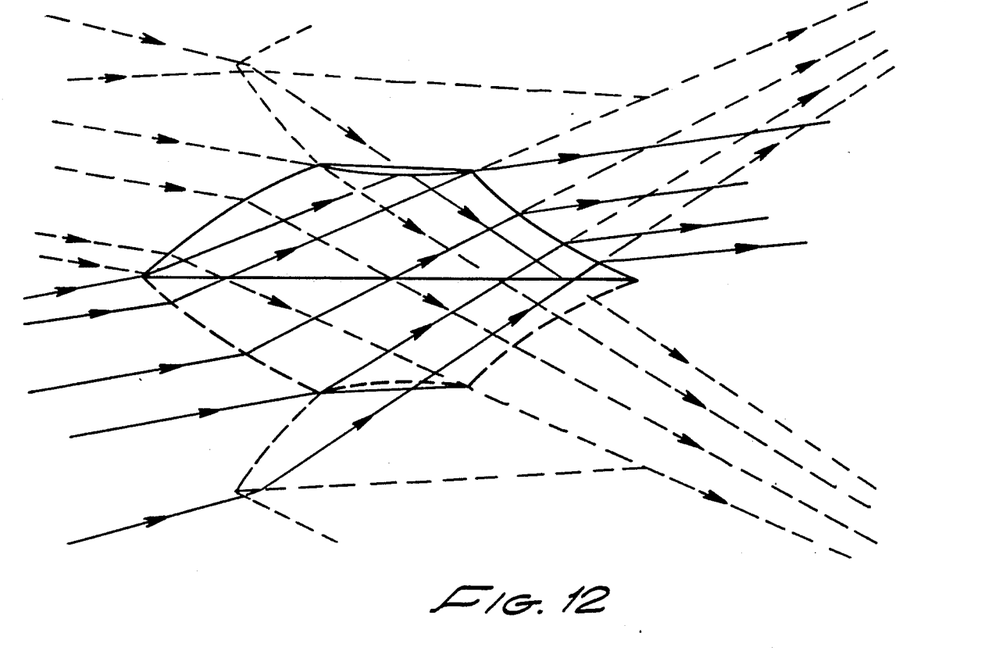
FIG. 12 shows the actual and virtual paths of radiation passing through a dove prism in a fourth form of the second embodiment of this invention.

FIG. 12 shows yet another form of the second embodiment of this invention. Here, the tip of each prism has some tilt and curvature to produce the desired convergence of energy emerging from the prism, and to extend the distance of the virtual focus of the input face of the prism by an amount equal to the increase in equivalent internal paths for radiation reflected three times internally in each prism.

This form adds the convergent-divergent action to the double air space design of FIG. 9, again giving one or more ranges of input angles with zero channel loss, depending on selected ratios of apex to base lengths.

What is claimed is:

1. A system for changing the direction of propagation of radiation incident of the system comprising a periodic array of pairs of dove prisms, said dove prisms being light-transmissive, and being adapted to change said direction of propagation internally to said prisms, wherein the apexes of the dove prisms in each pair face one another.

2. The system of claim 1 wherein said dove prisms in each of said pairs are joined to one another at their apexes.

3. The system of claim 2 wherein each of said dove prisms has a substantially flat surface at its apex, said flat surface being substantially parallel to the base of said prism, and having a length in the range of about 5% to about 25% of the length of the base.

4. The system of claim 1 wherein each of the dove prisms in each pair has a flat surface substantially parallel to the base of each prism and wherein the dove prisms in each pair are joined to one another along these flat surfaces at their apexes.

5. The system of claim 1 wherein modified dove prisms in each pair have a substantially flat reflecting surface substantially parallel and opposite to the base of each prism and wherein a space is maintained between the flat surfaces at the top of the dove prisms in each pair.

6. The system of claim 5 further comprising maintaining a space between the apexes of the dove prisms in each of said pairs, and between each of said pairs.

7. The system of claim 5 wherein the surface at the prism apex has a mean tilt with respect to the base plane in the range of about 1° to about 2.5°; and a radius of curvature in the range of about 40 to about 180 times the prism base length; and wherein one face of each of said dove prisms has positive curvature with a radius of curvature in the range of about 1.5 to about 4 times the prism base length; and wherein the other face of each dove prism has negative curvature with a radius of curvature in the range of about 1.2 to about 3 times the prism base length, such that radiation incident on and passing through said one face and then through said other face undergoes a reduction in lateral beam width of at least about 10%.

8. The system of claim 1 wherein the refractive index of said dove prism is in the range of about 1.4 to about 1.6, and where the array is rotatable along an axis perpendicular to the mean direction of propagation of said radiation beam and parallel to the reflecting faces of each of said prisms.

9. A system comprising two arrays as defined in claim 8, with the axes of said arrays at sufficient angles to one another that radiation incident on said system is deviated twice in different planes to emerge or propagate in an arbitrary direction in space.

10. The system of claim 1 wherein the width of each of said dove prisms is in the range of about 0.01 inch to about 0.25 inch, and the height of each of said dove prisms, is up to about 10 feet.

11. The system of claim 1 wherein the input and output faces on each of said dove prisms are adapted to reduce the lateral beam width or to partially converge and to diverge incident radiation passing through the system.

12. The system of claim 1 wherein one face of each dove prism in said array is positively curved so that radiation passing through said one face undergoes convergence and wherein the other face of each dove prism is negatively curved so that radiation passing through said other face undergoes divergence.

* * * * *